US010256008B2

(12) United States Patent
Johnson et al.

(10) Patent No.: US 10,256,008 B2
(45) Date of Patent: Apr. 9, 2019

(54) ELECTRICAL APPARATUS FOR THE GENERATION, TRANSMISSION, DISTRIBUTION AND/OR USAGE OF ELECTRICAL ENERGY AND METHOD FOR RECOVERING A SUBSTANCE FROM AN INSULATION MEDIUM OF SUCH AN APPARATUS

(71) Applicant: ABB Schweiz AG, Baden (CH)

(72) Inventors: Charles Johnson, Wytheville, VA (US); Daniel Boesch, Hägglingen (CH); Javier Mantilla Florez, Baden (CH); Oliver Cossalter, Fislisbach (CH); Stephan Grob, Baden (CH)

(73) Assignee: ABB Schweiz AG, Baden (CH)

( * ) Notice: Subject to any disclaimer, the term of this patent is extended or adjusted under 35 U.S.C. 154(b) by 138 days.

(21) Appl. No.: 15/356,991

(22) Filed: Nov. 21, 2016

(65) Prior Publication Data

US 2017/0069407 A1    Mar. 9, 2017

Related U.S. Application Data

(63) Continuation of application No. PCT/EP2015/060994, filed on May 19, 2015.

(30) Foreign Application Priority Data

May 20, 2014    (WO) ................ PCT/EP2014/060300

(51) Int. Cl.
*H01B 3/24* (2006.01)
*H01B 3/56* (2006.01)
(Continued)

(52) U.S. Cl.
CPC ............. *H01B 3/24* (2013.01); *B01D 5/0069* (2013.01); *B01D 7/02* (2013.01); *B01D 53/002* (2013.01);
(Continued)

(58) Field of Classification Search
CPC .......... H02B 7/01; G05D 22/02; G05D 23/19; G05D 16/20
(Continued)

(56) References Cited

U.S. PATENT DOCUMENTS

| 2013/0277438 A1* | 10/2013 | Terwiesch | ............. G05D 16/20 |
| | | | 236/1 E |
| 2016/0043533 A1* | 2/2016 | Tehlar | ..................... H02B 3/00 |
| | | | 361/618 |

(Continued)

FOREIGN PATENT DOCUMENTS

| WO | 2010142346 A1 | 12/2010 |
| WO | 2010142353 A1 | 12/2010 |
| WO | 2012080222 A1 | 6/2012 |
| WO | 2012080246 A1 | 6/2012 |
| WO | 2014053661 A1 | 4/2014 |

OTHER PUBLICATIONS

European Patent Office, International Search Report & Written Opinion issued in corresponding Application No. PCT/EP2015/060994, dated Aug. 4, 2015, 8 pp.
(Continued)

*Primary Examiner* — Duane Smith
*Assistant Examiner* — Minh Chau T Pham
(74) *Attorney, Agent, or Firm* — J. Bruce Schelkopf; Taft Stettinius & Hollister LLP

(57) ABSTRACT

An electrical apparatus for electrical energy handling includes a housing with at least one insulation space, in which an electrical component is arranged and which contains an insulation medium surrounding the electrical component. The insulation medium includes an organofluorine compound and at least one further gaseous component. The apparatus further includes a gas flow generating device for flowing an initial gas mixture, containing the organofluorine compound and at least one further component of the insulation medium, out of the insulation space through an outlet
(Continued)

opening arranged in the housing. A substance recovery device downstream of outlet opening includes a separator for separating the organofluorine compound from the at least one further component of the initial gas mixture, the separator being a liquefaction device for liquefying and/or solidification device for solidifying the organofluorine compound.

41 Claims, 1 Drawing Sheet

(51) Int. Cl.
  *B01D 53/00*  (2006.01)
  *B01D 5/00*  (2006.01)
  *B01D 7/02*  (2006.01)
  *H02B 13/055*  (2006.01)
  *B01D 7/00*  (2006.01)

(52) U.S. Cl.
  CPC ................ *H01B 3/56* (2013.01); *B01D 7/00* (2013.01); *B01D 2257/2066* (2013.01); *H02B 13/055* (2013.01)

(58) Field of Classification Search
USPC .......... 174/137 R; 310/52–56; 361/604, 612, 361/613, 618; 236/1 E; 55/385.1
See application file for complete search history.

(56) References Cited

U.S. PATENT DOCUMENTS

| | | | |
|---|---|---|---|
| 2017/0148563 A1* | 5/2017 | Bergsblom | H01F 27/18 |
| 2017/0162349 A1* | 6/2017 | Girodet | H01H 33/75 |
| 2017/0213673 A1* | 7/2017 | Elshani | H01H 33/56 |
| 2017/0317475 A1* | 11/2017 | Kramer | G01N 21/3504 |
| 2018/0005727 A1* | 1/2018 | Di-Gianni | H01B 3/56 |

OTHER PUBLICATIONS

European Patent Office, International Search Report & Written Opinion issued in corresponding Application No. PCT/EP2014/060300, dated Jan. 15, 2015, 6 pp.

\* cited by examiner

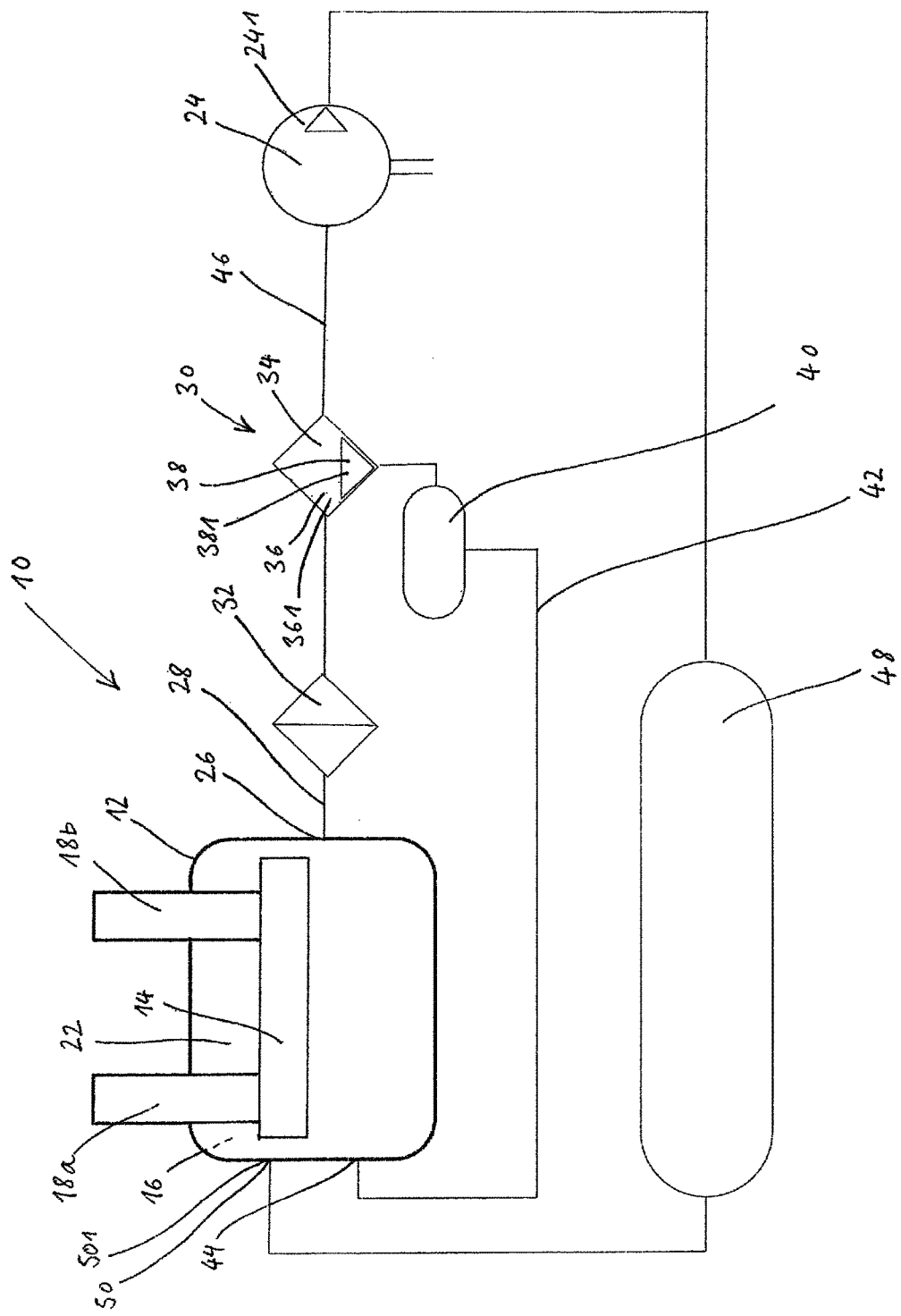

ELECTRICAL APPARATUS FOR THE GENERATION, TRANSMISSION, DISTRIBUTION AND/OR USAGE OF ELECTRICAL ENERGY AND METHOD FOR RECOVERING A SUBSTANCE FROM AN INSULATION MEDIUM OF SUCH AN APPARATUS

The present invention relates to an electrical apparatus for the generation, transmission, distribution and/or usage of electrical energy as well as to a method for recovering a substance from an insulation medium of such an apparatus.

Dielectric insulation media in liquid or gaseous state are conventionally applied for the insulation of an electrical component in a wide variety of apparatuses, such as for example switchgears, gas-insulated substations (GIS), gas-insulated lines (GIL), or transformers.

In medium or high voltage metal-encapsulated switchgears, for example, the electrical component is arranged in a gas-tight housing, the interior of which defines an insulating space, said insulation space comprising an insulation gas and separating and electrically insulating the housing from the electrical component. For interrupting the current in a high voltage switchgear, the insulating gas further functions as an arc extinction gas.

Recently, the use of organofluorine compounds in an insulating gas has been suggested. Specifically, WO-A-2010/142346 discloses a dielectric insulation medium comprising a fluoroketone having from 4 to 12 carbon atoms. A dielectric insulation medium of particular relevance is further disclosed in WO 2012/080246, relating to a medium comprising a dielectric insulation gas, which comprises a fluoroketone containing exactly 5 carbon atoms in a mixture with a dielectric insulation gas component different from said fluoroketone. Still, further WO-A-2012/080222 discloses a dielectric insulation medium comprising a hydrofluoromonoether.

Both groups of compounds have been shown to have high insulation capabilities, in particular a high dielectric strength, as well as high arc extinction capabilities. At the same time, they have a very low Global Warming Potential (GWP) and very low toxicity. The combination of these characteristics renders these organofluorine compounds highly suitable as a substitute for $SF_6$ (sulphur hexafluoride), which is commonly used as a dielectric insulation medium, but which is known to have a high GWP.

Notwithstanding their low GWP and toxicity, it would be highly desirable to keep the amount of organofluorine compound to be used during long term operation of the apparatus to a minimum for both ecological and economic reasons.

However, in particular during e.g. a switching operation, which is accompanied by a high temperature increase in the insulation space, organofluorine compounds can be subject to decomposition. Different to $SF_6$ the decomposed organofluorine compounds usually do not recombine.

In order to keep the insulation space essentially free from harmful decomposition products, WO 2014/053661 suggests an apparatus for the generation, the distribution and/or the usage of electrical energy comprising a molecular sieve arranged such as to come into contact with the insulation gas, the molecular sieve having an average pore size greater than the molecular size of at least one decomposition product of the organofluorine compound generated during operation of the apparatus.

During decommissioning and maintenance activities (e.g. refurbishment after a heavy short circuit event) it may be required to reduce or completely evacuate the pressure of the electrical apparatus to a safe level proper for handling.

When applying conventional evacuation techniques using a pump, problems regarding the removal of the insulation medium are particularly pronounced, since the boiling point of the organofluorine compound comprised in the insulation medium is typically relatively high.

The problem to be solved by the present invention is, thus, to provide an electrical apparatus using an insulation medium comprising an organofluorine compound, said apparatus allowing to minimize the amount of organofluorine compound to be used and at the same time, the present invention shall allow for a safe overall operability, and in particular for a safe evacuation operation.

The problem is solved by the subject matter of the independent claims. Preferred embodiments are defined in the dependent claims and claim combinations.

According to claim 1, the present invention relates to an electrical apparatus for the generation, transmission, distribution and/or usage of electrical energy, the electrical apparatus comprising a housing enclosing an electrical apparatus interior space, at least a portion of the electrical apparatus interior space comprising at least one insulation space, in which an electrical component is arranged and which contains an insulation medium surrounding the electrical component. The insulation medium comprises an organofluorine compound and at least one further component in gaseous phase. The apparatus further comprises a gas flow generating device designed to generate a flow of an initial gas mixture through an outlet opening arranged in the housing out of the insulation space, the initial gas mixture containing the organofluorine compound and at least one further component of the insulation medium.

Downstream of the outlet opening, a substance recovery device is arranged, the substance recovery device comprising a separator for separating the organofluorine compound from the at least one remaining component of the initial gas mixture.

According to the invention, the separator is or comprises a liquefaction device adapted for or having means for liquefying and/or a solidification device adapted for or having means for solidifying the organofluorine compound.

Due to the presence of the substance recovery device, the present invention allows the organofluorine compound to be recycled into the insulation space, which is not only highly advantageous from an economic point of view. Since disposal of the organofluorine compound can be omitted, the present invention also brings an ecologic benefit.

As mentioned, recovery is according to the invention obtained by liquefaction and/or solidification of the organofluorine compound. Since separation by liquefaction is in most cases simpler to perform than by solidification, use of a liquefaction device is the preferred embodiment.

Specifically, the terms "liquefying" or "liquefaction" as used in the context of the present invention are to be interpreted as a phase transition of the respective substance, particularly the gaseous organofluorine compound, to the liquid phase. In analogy, the terms "solidifying" or "solidification" as used in the context of the present invention are to be interpreted as a phase transition of the respective substance, particularly the gaseous organofluorine compound, to the solid phase.

More specifically, a phase separation is achieved by the liquefaction and/or solidification, which in most cases allows the substances of the respective phases to be separated from each other mechanically.

As will be discussed in more detail below, the separator used according to the present invention generally functions in manner to allow the liquid or solid organofluorine compound obtained to flow or fall down, thus allowing consolidating and collecting the liquid or solid organofluorine compound.

The separator is thus in any respect different from a filter through which the insulation gas is pumped and which requires that the organofluorine compound remains in gaseous phase.

For relatively high dew points of organofluorine compounds, a high yield recovery can be achieved in a very simple, fast and economic manner by cooling and/or pressurization of the initial gas mixture. Recovery is particularly straightforward in embodiments in which the difference in the dew point of the organofluorine compound and the further component, particularly the background gas or background gas component, is pronounced.

For the actual separation of the liquid or solid phase components from the remaining component(s) of the initial gas mixture, different technologies can be used. For example, the separator can be or can comprise for example a snow-gun, a cyclone separator, a centrifuge drum or a knitmesh (or wire-mesh) separator. Depending on the separator or the separation principle used, the separator comprises a liquefaction device or solidification device.

If on the one hand a knitmesh separator is used, for example, the separator comprises a liquefaction device for generating droplets, whereas if a snow-gun is used, the separator comprises a solidification device for generating solid crystalline particles.

As will be discussed in more detail below, the present invention further allows evacuation of the insulation space by means of a pump without facing the problem of liquefaction in the pressurization zone of the pump. Thus, replacement of the insulation medium can be carried out in a very safe manner.

The term "initial gas mixture" as used in the context of the present invention is to be interpreted broadly and encompasses any possible gas mixture containing the organofluorine compound and at least one further component of the insulation medium.

According to one specific embodiment, the initial gas mixture is at least essentially identical to the insulation medium.

In this regard, the term "insulation medium" relates to the insulation medium to be replaced, i.e. the insulation medium (or its composition) present in the insulation space at the time directly prior to refurbishment. This insulation medium has in comparison to the insulation medium used for filling the insulation space a lower amount of organofluorine compound and a higher amount of decomposition products. It is understood that the composition of the insulation medium can change over time, specifically due to the mentioned decomposition phenomena. For example, partial decomposition of the organofluorine compound can occur during a switching operation of a switching component.

More specifically, the initial gas mixture comprises apart from the organofluorine compound a background gas and at least one decomposition product.

Alternatively, the term "initial gas mixture" can also relate to the insulation medium used for filling the insulation space, i.e. the fresh mixture, provided that it contains apart from the organofluorine compound a further component, typically a background gas. The fresh mixture is typically devoid of any decomposition products.

According to an embodiment, the liquefaction device is specifically adapted for liquefying and/or the solidification device is specifically adapted for solidifying the organofluorine compound only. In further embodiments, the gas mixture passes in the liquefaction and/or solidification device several cooling and/or pressurization steps, each one for removing at least one further component of the gas mixture. In this manner, e.g. decomposition products with relative high dew points can separately be removed from the gas mixture and, in the following, can be conveyed to separate processing and/or disposal steps.

According to further embodiments, the liquefaction device and/or the solidification device is or comprises a cooler for cooling the initial gas mixture down to a temperature below the dew point of the organofluorine compound. Additionally or alternatively, the liquefaction device and/or the solidification device can be or can comprise a compressor for liquefying the organofluorine compound by a pressure increase.

In embodiments, the outlet opening opens into a primary gas channel which fluidly connects the insulation space with the substance recovery device. Alternatively, the substance recovery device can be arranged directly adjacent to the housing in a manner that the outlet opening opens directly into the substance recovery device.

It further embodiments, the substance recovery device further comprises an organoflourine compound collecting device for collecting the organofluorine compound separated by the separator. In this regard, it is further possible that the substance recovery device comprises at least one organofluorine compound reservoir tank for storing the organofluorine compound separated by the separator. Thus, the organofluorine compound is collected, e.g. by means of a vessel into which the liquid organofluorine compound falls or flows, and is ultimately directed to the organofluorine compound reservoir tank in which the organofluorine compound is held under storage conditions. From there, it can be reintroduced into the insulation space when refilling is necessary.

In further embodiments, the apparatus further comprises a filter arranged between the outlet opening and the substance recovery device and designed such to remove solid or liquid impurities from the flow of the initial mixture. This filter can be attributed to the primary gas channel, e.g. by arranging it in the primary channel, thus forcing the whole amount of the initial gas mixture to pass the filter. Alternatively, a by-pass channel to the primary channel can be provided with the filter being arranged in the by-pass channel, thus only forcing a part of the initial gas mixture to pass the filter.

By a pre-removal of solid or liquid impurities from the initial gas mixture prior to its entering into the substance recovery device, the risk of clogging of the substance recovery device, and ultimately of a failure of the device, can efficiently be reduced.

In further embodiments, the apparatus further comprises an organofluorine compound recycling channel leading from the substance recovery device to an organofluorine compound inlet opening arranged in the housing and designed such to reintroduce the organofluorine compound into the insulation space. In this regard, it is particularly preferred that the organofluorine compound recycling channel leads from the organofluorine compound reservoir tank to the organofluorine compound inlet opening.

In embodiments, upstream of the organofluorine compound inlet opening an organofluorine compound treatment device can be arranged, in particular for removing impurities from the organofluorine compound to be reintroduced into the insulation space. This organofluorine compound treatment device can be attributed to the organofluorine compound recycling channel. Likewise, it can also be a component of the organofluorine compound reservoir tank or can be arranged upstream of the organofluorine reservoir tank, if such a tank is present.

According to a further embodiment, the gas stream generating device is a pump, more particularly a suction pump arranged downstream of the substance recovery device. In embodiments, the suction pump can further function as a compressor for compressing the at least one remaining component of the initial gas mixture, as discussed in more detail below.

According to a further embodiment, the pump is designed such to purge the insulation space, thereby forcing the initial gas mixture out of the insulation space. This pump can be identical to the suction pump mentioned above. In this case, both the pump inlet as well as the pump outlet are connected to the insulation space, such that a flow of gas from the insulation space to the pump is generated on the suction side and a flow of gas from the pump to the insulation space is generated on the discharge side of the pump.

In still further embodiments, at least one secondary gas channel branches off from the separator of the substance recovery device, the secondary gas channel being adapted for guiding the at least one remaining component of the initial gas mixture without the organofluorine compound. It is thereby particularly preferred that the secondary gas channel leads to a secondary reservoir tank for storing the at least one remaining component of the initial gas mixture. Forcing the gas through the secondary gas channel can be achieved by means of a pump, in particular by means of the suction pump described above.

In embodiments, the pump further functions as a compressor, thus allowing compressing of the gas until liquefaction of at least some of the remaining components, if desired.

According to one specific embodiment, the secondary gas channel, and optionally the secondary reservoir tank, is fluidly connected to a gas inlet opening arranged in the housing. Thus, not only the organofluorine compound, but also some or all of the remaining components can be recycled to the insulation space, thus further contributing to the efficiency of the apparatus and the gas recovery process.

This gas inlet opening can either be the primary gas inlet opening mentioned above. In this case, a gas component mixing unit is arranged upstream of the primary gas inlet opening for mixing the (recovered) organofluorine compound and the (recovered) remaining compound and, optionally further supplementing the mixture, to obtain the desired gas composition to be introduced into the insulation space.

In alternative embodiments, the gas inlet opening can be a separate, secondary inlet opening for reintroducing the at least one remaining component of the initial gas mixture separately into the insulation space. In this regard, it is particularly preferred that upstream of the gas inlet opening a secondary treatment device is arranged, in particular for purifying the at least one remaining component of the initial gas mixture.

According to a further embodiment, the organofluorine compound is selected from the group consisting of: fluoroethers, in particular hydrofluoromonoethers, fluoroketones, fluoroolefins, in particular hydrofluoroolefins, and mixtures thereof, since these classes of compounds have been found to have very high insulation capabilities, in particular a high dielectric strength (or breakdown field strength) and at the same time a low GWP and low toxicity.

The invention encompasses both embodiments in which the respective insulation medium comprises either one of a fluoroether, in particular a hydrofluoromonoether, a fluoroketone and a fluoroolefin, in particular a hydrofluoroolefin, as well as embodiments in which it comprises a mixture of at least two of these compounds.

It is further preferred that the insulation space comprises a background gas, in particular selected from the group consisting of: air, an air component, nitrogen, oxygen, carbon dioxide, a nitrogen oxide and mixtures thereof. Thus, at least one of the remaining components of the initial gas mixture, i.e. the initial gas mixture without the organofluorine compound, is preferably selected from the group consisting of: air, an air component, nitrogen, oxygen, carbon dioxide, a nitrogen oxide and mixtures thereof.

The term "fluoroether" as used in the context of the present invention encompasses both perfluoroethers, i.e. fully fluorinated ethers, and hydrofluoroethers, i.e. ethers that are only partially fluorinated. The term "fluoroether" further encompasses saturated compounds as well as unsaturated compounds, i.e. compounds including double and/or triple bonds between carbon atoms. The at least partially fluorinated alkyl chains attached to the oxygen atom of the fluoroether can, independently of each other, be linear or branched.

The term "fluoroether" further encompasses both non-cyclic and cyclic ethers. Thus, the two alkyl chains attached to the oxygen atom can optionally form a ring. In particular, the term encompasses fluorooxiranes. In a specific embodiment, the organofluorine compound according to the present invention is a perfluorooxirane or a hydrofluorooxirane, more specifically a perfluorooxirane or hydrofluorooxirane comprising from three to fifteen carbon atoms.

In embodiments, the respective insulation medium comprises a hydrofluoromonoether containing at least three carbon atoms. Apart from their high dielectric strength, these hydrofluoromonoethers are chemically and thermally stable up to temperatures above 140° C. They are further non-toxic or have a low toxicity level. In addition, they are non-corrosive and non-explosive.

The term "hydrofluoromonoether" as used herein refers to a compound having one and only one ether group, said ether group linking two alkyl groups, which can be, independently from each other, linear or branched, and which can optionally form a ring. The compound is thus in clear contrast to the compounds disclosed in e.g. U.S. Pat. No. 7,128,133, which relates to the use of compounds containing two ether groups, i.e. hydrofluorodiethers, in heat-transfer fluids. The term "hydrofluoromonoether" as used herein is further to be understood such that the monoether is partially hydrogenated and partially fluorinated. It is further to be understood such that it may comprise a mixture of differently structured hydrofluoromonoethers. The term "structurally different" shall broadly encompass any difference in sum formula or structural formula of the hydrofluoromonoether.

As mentioned above, hydrofluoromonoethers containing at least three carbon atoms have been found to have a relatively high dielectric strength. Specifically, the ratio of the dielectric strength of the hydrofluoromonoethers according to the present invention to the dielectric strength of $SF_6$ is greater than about 0.4.

As also mentioned, the GWP of the hydrofluoromonoethers is low. Preferably, the GWP is less than 1,000 over 100 years, more specifically less than 700 over 100 years. The hydrofluoromonoethers mentioned herein have a relatively low atmospheric lifetime and in addition are devoid of halogen atoms that play a role in the ozone destruction catalytic cycle, namely Cl, Br or I. Their Ozone Depletion Potential (ODP) is zero, which is very favourable from an environmental perspective.

The preference for a hydrofluoromonoether containing at least three carbon atoms and thus having a relatively high boiling point of more than −20° C. is based on the finding that a higher boiling point of the hydrofluoromonoether generally goes along with a higher dielectric strength.

According to other embodiments, the hydrofluoromonoether contains exactly three or four or five or six carbon atoms, in particular exactly three or four carbon atoms, most preferably exactly three carbon atoms. More particularly, the hydrofluoromonoether is thus at least one compound selected from the group consisting of the compounds defined by the following structural formulae in which a part of the hydrogen atoms is each substituted by a fluorine atom:

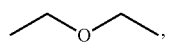  (Oa)

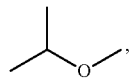  (Ob)

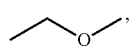  (Oc)

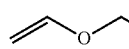  (Od)

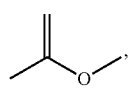  (Oe)

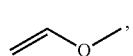  (Of)

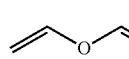  (Og)

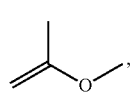  (Oh)

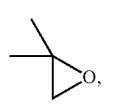  (Oi)

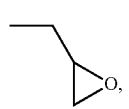  (Oj)

  (Ok)

  (Ol)

-continued

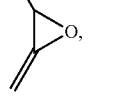  (Om)

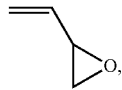  (On)

(Oo)

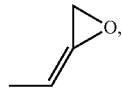  (Op)

(Oq)

  (Or)

By using a hydrofluoromonoether containing three or four carbon atoms, no liquefaction occurs under typical operational conditions of the apparatus. Thus, a dielectric insulation fluid, every component of which is in the gaseous state at operational conditions of the apparatus, can be achieved. Nevertheless, the boiling point of this hydrofluoromonoether is still high enough to allow liquefaction by means of the liquefaction device of the present invention.

Considering flammability of the compounds, it is further advantageous that the ratio of the number of fluorine atoms to the total number of fluorine and hydrogen atoms, here briefly called "F-rate", of the hydrofluoromonoether is at least 5:8. It has been found that compounds falling within this definition are generally non-flammable and thus result in an insulation medium complying with highest safety requirements. Thus, safety requirements of the electrical insulator and the method of its production can readily be fulfilled by using a corresponding hydrofluoromonoether.

According to other embodiments, the ratio of the number of fluorine atoms to the number of carbon atoms, here briefly called "F/C-ratio", ranges from 1.5:1 to 2:1. Such compounds generally have a GWP of less than 1,000 over 100 years and are thus very environment-friendly. It is particularly preferred that the hydrofluoromonoether has a GWP of less than 700 over 100 years.

According to other embodiments of the present invention, the hydrofluoromonoether has the general structure (O)

$$C_aH_bF_c-O-C_dH_eF_f \qquad (O)$$

wherein a and d independently are an integer from 1 to 3 with a+d=3 or 4 or 5 or 6, in particular 3 or 4, b and c independently are an integer from 0 to 11, in particular 0 to 7, with b+c=2a+1, and e and f independently are an integer from 0 to 11, in particular 0 to 7, with e+f=2d+1, with further at least one of b and e being 1 or greater and at least one of c and f being 1 or greater.

It is thereby a preferred embodiment that in the general structure or formula (O) of the hydrofluoromonoether: a is 1, b and c independently are an integer ranging from 0 to 3 with b+c=3, d=2, e and f independently are an integer ranging from 0 to 5 with e+f=5, with further at least one of b and e being 1 or greater and at least one of c and f being 1 or greater.

According to a more particular embodiment, exactly one of c and f in the general structure (O) is 0. The corresponding grouping of fluorines on one side of the ether linkage, with the other side remaining unsubstituted, is called "segregation". Segregation has been found to reduce the boiling point compared to unsegregated compounds of the same chain length.

Most preferably, the hydrofluoromonoether is selected from the group consisting of pentafluoro-ethyl-methyl ether ($CH_3$—O—$CF_2CF_3$) and 2,2,2-trifluoroethyl-trifluoromethyl ether ($CF_3$—O—$CH_2CF_3$).

Pentafluoro-ethyl-methyl ether has a boiling point of +5.25° C. and a GWP of 697 over 100 years, the F-rate being 0.625, while 2,2,2-trifluoroethyl-trifluoromethyl ether has a boiling point of +11° C. and a GWP of 487 over 100 years, the F-rate being 0.75. They both have an ODP of 0 and are thus environmentally fully acceptable.

In addition, pentafluoro-ethyl-methyl ether has been found to be thermally stable at a temperature of 175° C. for 30 days and therefore to be fully suitable for the operational conditions given in the apparatus. Since thermal stability studies of hydrofluoromonoethers of higher molecular weight have shown that ethers containing fully hydrogenated methyl or ethyl groups have a lower thermal stability compared to those having partially hydrogenated groups, it can be assumed that the thermal stability of 2,2,2-trifluoroethyl-trifluoromethyl ether is even higher.

Hydrofluoromonoethers in general, and pentafluoro-ethyl-methyl ether as well as 2,2,2-trifluoroethyl-trifluoromethyl ether in particular, display a low risk of human toxicity. This can be concluded from the available results of mammalian HFC (hydrofluorocarbon) tests. Also, information available on commercial hydrofluoromonoethers do not give any evidence of carcinogenicity, mutagenicity, reproductive or developmental effects and other chronic effects of the compounds of the present application.

Based on the data available for commercial hydrofluoro ethers of higher molecular weight, it can be concluded that the hydrofluoromonoethers, and in particular pentafluoro-ethyl-methyl ether as well as 2,2,2-trifluoroethyl-trifluoromethyl ether, have a lethal concentration LC 50 of higher than 10,000 ppm, rendering them suitable also from a toxicological point of view.

The hydrofluoromonoethers mentioned have a higher dielectric strength than air. In particular, pentafluoro-ethyl-methyl ether at 1 bar has a dielectric strength about 2.4 times higher than that of air at 1 bar.

Given its boiling point, which is preferably below 55° C., more preferably below 40° C., in particular below 30° C., the hydrofluoromonoethers mentioned, particularly pentafluoro-ethyl-methyl ether and 2,2,2-trifluoroethyl-trifluoromethyl ether, respectively, are normally in the gaseous state at operational conditions. Thus, a dielectric insulation medium in which every component is in the gaseous state at operational conditions of the apparatus can be achieved, which is advantageous.

Alternatively or additionally to the hydrofluoromonoethers mentioned above, the respective insulation medium comprises a fluoroketone containing from four to twelve carbon atoms.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds between carbon atoms. The at least partially fluorinated alkyl chain of the fluoroketones can be linear or branched, or can form a ring, which optionally is substituted by one or more alkyl groups. In exemplary embodiments, the fluoroketone is a perfluoroketone. In further exemplary embodiment, the fluoroketone has a branched alkyl chain, in particular an at least partially fluorinated alkyl chain. In still further exemplary embodiments, the fluoroketone is a fully saturated compound.

According to another aspect, the insulation medium according to the present invention can comprise a fluoroketone having from 4 to 12 carbon atoms, the at least partially fluorinated alkyl chain of the fluoroketone forming a ring, which is optionally substituted by one or more alkyl groups.

It is particularly preferred that the insulation medium comprises a fluoroketone containing exactly five or exactly six carbon atoms or mixtures thereof. Compared to fluoroketones having a greater chain length with more than six carbon atoms, fluoroketones containing five or six carbon atoms have the advantage of a relatively low boiling point, allowing to avoid liquefaction under operational conditions. Nevertheless, the boiling point of this fluoroketone is still high enough to allow liquefaction by means of the liquefaction device of the present invention.

According to embodiments, the fluoroketone is at least one compound selected from the group consisting of the compounds defined by the following structural formulae in which at least one hydrogen atom is substituted with a fluorine atom:

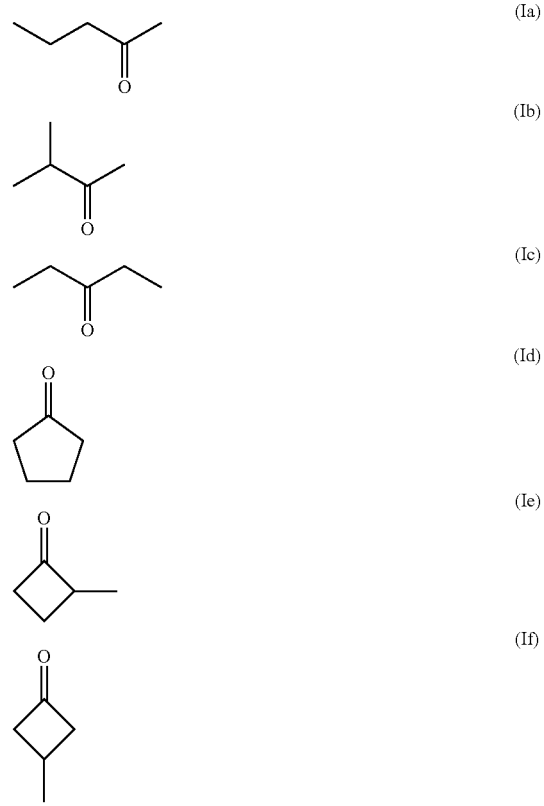

-continued

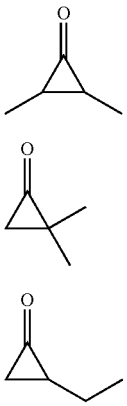

(Ig)

(Ih)

(Ii)

Fluoroketones containing five or more carbon atoms are further advantageous, because they are generally non-toxic with outstanding margins for human safety. This is in contrast to fluoroketones having less than four carbon atoms, such as hexafluoroacetone (or hexafluoropropanone), which are toxic and very reactive. In particular, fluoroketones containing exactly five carbon atoms, herein briefly named fluoroketones a), and fluoroketones containing exactly six carbon atoms are thermally stable up to 500° C.

According to a specific embodiment, the dielectric insulation medium according to the present invention, in particular comprising a fluoroketone having exactly 5 carbon atoms, can further comprise a background gas, in particular selected from the group consisting of: air, air component, nitrogen, oxygen, carbon dioxide, a nitrogen oxide (including but not limited to $NO_2$, NO, $N_2O$), and mixtures thereof.

In embodiments of this invention, the fluoroketones, in particular fluoroketones a), having a branched alkyl chain are preferred, because their boiling points are lower than the boiling points of the corresponding compounds (i.e. compounds with same molecular formula) having a straight alkyl chain.

According to embodiments, the fluoroketone a) is a perfluoroketone, in particular has the molecular formula $C_5F_{10}O$, i.e. is fully saturated without double or triple bonds between carbon atoms. The fluoroketone a) may preferably be selected from the group consisting of 1,1,1,3,4,4,4-heptafluoro-3-(trifluoromethyl)butan-2-one (also named decafluoro-2-methylbutan-3-one), 1,1,1,3,3,4,4,5,5,5-decafluoropentan-2-one, 1,1,1,2,2,4,4,5,5,5-decafluoropentan-3-one and octafluorocylcopentanone, and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

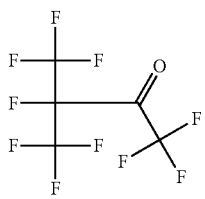

(I)

1,1,1,3,4,4,4-heptafluoro-3-(trifluoromethyl)butan-2-one, here briefly called "C5-ketone", with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with a dielectric carrier gas, has very low GWP and has a low boiling point. It has an ODP of 0 and is practically non-toxic.

According to embodiments, even higher insulation capabilities can be achieved by combining the mixture of different fluoroketone components. In embodiments, a fluoroketone containing exactly five carbon atoms, as described above and here briefly called fluoroketone a), and a fluoroketone containing exactly six carbon atoms or exactly seven carbon atoms, here briefly named fluoroketone c), can favourably be part of the dielectric insulation at the same time. Thus, an insulation medium can be achieved having more than one fluoroketone, each contributing by itself to the dielectric strength of the insulation medium.

In embodiments, the further fluoroketone c) is at least one compound selected from the group consisting of the compounds defined by the following structural formulae in which at least one hydrogen atom is substituted with a fluorine atom:

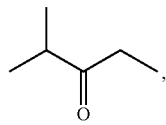

(IIa)

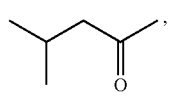

(IIb)

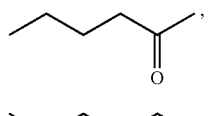

(IIc)

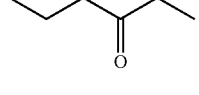

(IId)

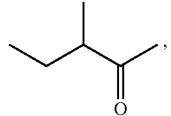

(IIe)

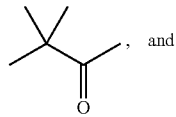

, and (IIf)

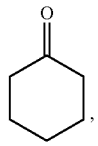

, (IIg)

as well as any fluoroketone having exactly 6 carbon atoms, in which the at least partially fluorinated alkyl chain of the fluoroketone forms a ring, which is substituted by one or more alkyl groups (IIh);

and/or is at least one compound selected from the group consisting of the compounds defined by the following structural formulae in which at least one hydrogen atom is substituted with a fluorine atom:

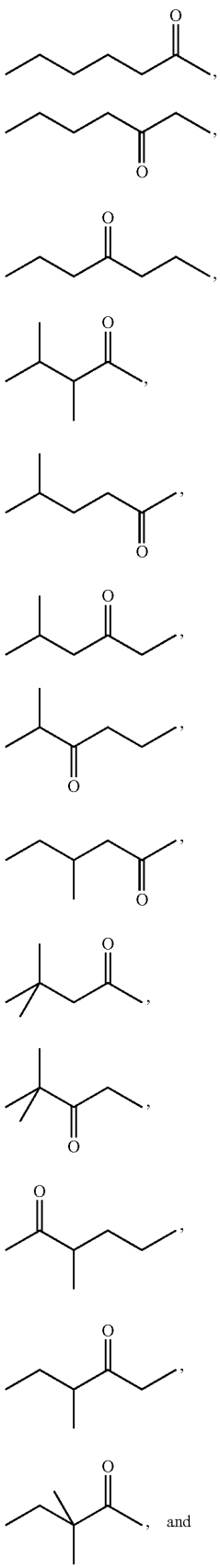

in particular dodecafluorocycloheptanone,
as well as any fluoroketone having exactly 7 carbon atoms, in which the at least partially fluorinated alkyl chain of the fluoroketone forms a ring, which is substituted by one or more alkyl groups (IIIo).

The present invention encompasses each compound or each combination of compounds selected from the group consisting of the compounds according to structural formulae (Ia) to (Ii), (IIa) to (IIh), (IIIa) to (IIIo), and mixtures thereof.

According to another aspect, the dielectric insulation medium according to the present invention can comprise a fluoroketone having exactly 6 carbon atoms, in which the at least partially fluorinated alkyl chain of the fluoroketone forms a ring, optionally substituted by one or more alkyl groups. Furthermore, such dielectric insulation medium can comprise a background gas, in particular selected from the group consisting of: air, air component, nitrogen, oxygen, carbon dioxide, a nitrogen oxide (including but not limited to $NO_2$, $NO$, $N_2O$), and mixtures thereof. Furthermore, an electrical apparatus comprising such a dielectric insulation medium is disclosed.

According to still another aspect, the dielectric insulation medium according to the present invention can comprise a fluoroketone having exactly 7 carbon atoms, in which the at least partially fluorinated alkyl chain of the fluoroketone forms a ring, optionally substituted by one or more alkyl groups. Furthermore, such dielectric insulation medium can comprise a background gas, in particular selected from the group consisting of: air, air component, nitrogen, oxygen, carbon dioxide, a nitrogen oxide (including but not limited to $NO_2$, $NO$, $N_2O$), and mixtures thereof. Furthermore, an electrical apparatus comprising such a dielectric insulation fluid is disclosed.

The present invention encompasses any dielectric insulation medium comprising each compound or each combination of compounds selected from the group consisting of the compounds according to structural formulae (Ia) to (Ii), (IIa) to (IIg), (IIIa) to (IIIn), and mixtures thereof, and with the dielectric insulation medium further comprising a background gas, in particular selected from the group consisting of: air, air component, nitrogen, oxygen, carbon dioxide, a nitrogen oxide (including but not limited to $NO_2$, $NO$, $N_2O$), and mixtures thereof. Furthermore, an electrical apparatus comprising such a dielectric insulation medium is disclosed.

Depending on the specific application of the electrical component of the apparatus of the present invention, a fluoroketone containing exactly six carbon atoms (falling under the designation "fluoroketone c)" mentioned above) may be preferred for the respective insulation space compartment; such a fluoroketone is non-toxic, with outstanding margins for human safety.

In embodiments, fluoroketone c), alike fluoroketone a), is a perfluoroketone, and/or has a branched alkyl chain, in particular an at least partially fluorinated alkyl chain, and/or the fluoroketone c) contains fully saturated compounds. In particular, the fluoroketone c) has the molecular formula $C_FF_{12}O$, i.e. is fully saturated without double or triple bonds between carbon atoms. More preferably, the fluoroketone c) can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,4,4,4-hexafluoro-3,3-bis(trifluoromethyl)butan-2-one (also named dodecafluoro-3,3-(dimethyl)butan-2-one), dodecafluorohexan-2-one, dodecafluorohexan-3-one and decafluorocyclohexanone (with sum formula $C_6F_{10}O$), and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one) can be represented by the following structural formula (II):

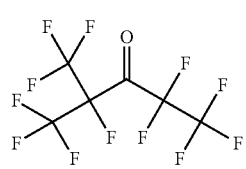

(II)

1,1,1,2,4,4,5,5,5-Nonafluoro-4-(trifluoromethyl)pentan-3-one (here briefly called "C6-ketone", with molecular formula $C_2F_5C(O)CF(CF_3)_2$) has been found to be particularly preferred for high voltage insulation applications because of its high insulating properties and its extremely low GWP. Specifically, its pressure-reduced breakdown field strength is around 240 kV/(cm*bar), which is much higher than the one of air having a much lower dielectric strength ($E_{cr}$=25 kV/(cm*bar). It has an ozone depletion potential of 0 and is non-toxic. Thus, the environmental impact is much lower than when using SF6, and at the same time outstanding margins for human safety are achieved.

As mentioned above, the organofluorine compound can also be a fluoroolefin, in particular a hydrofluoroolefin. More particularly, the fluoroolefin or hydrofluoroolefin contains exactly three carbon atoms.

According to an embodiment, the hydrofluoroolefin is thus selected from the group consisting of: 1,1,1,2-tetrafluoropropene (HFO-1234yf), 1,2,3,3-tetrafluoro-2-propene (HFO1234 yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zc), (Z)1,1,1,3-tetrafluoropropene (HFO-1234zeZ), (Z)1,1,2,3-tetrafluoro-2-propene (HFO-1234yeZ), (E)1,1,1,3-tetrafluoropropene (HFO-1234zeE), (E)1,1,2,3-tetrafluoro-2-propene (HFO-1234yeE), (Z)1,1,1,2,3-pentafluoropropene (HFO-1225yeZ), (E)1,1,1,2,3-pentafluoropropene (HFO-1225yeE) and combinations thereof.

In embodiments, the organofluorine compound can also be a fluoronitrile, in particular a perfluoronitrile. In particular, the organofluorine compound can be a fluoronitrile, specifically a perfluoronitrile, containing two carbon atoms, and/or three carbon atoms, and/or four carbon atoms.

More particularly, the fluoronitrile can be a perfluoroalkylnitrile, specifically perfluoroacetonitrile, perfluoropropionitrile ($C_2F_5CN$) and/or perfluorobutyronitrile ($C_3F_7CN$).

Most particularly, the fluoronitrile can be perfluoroisobutyronitrile (according to the formula $(CF_3)_2CFCN$) and/or perfluoro-2-methoxypropanenitrile (according to formula $CF_3CF(OCF_3)CN$). Of these, perfluoroisobutyronitrile is particularly preferred due to its low toxicity.

In general embodiments of the electrical apparatus or method for recovering, the organofluorine compound can be selected from the group consisting of: a fluoroether, an oxirane, a fluoroamine, a fluoroketone, a fluoroolefin, a fluoronitrile, and mixtures and/or decomposition products thereof. Herein, the terms "fluoroether", "oxirane", "fluoroamine", "fluoroketone", "fluoroolefin", and "fluoronitrile" refer to at least partially fluorinated compounds. In particular, the term "fluoroether" encompasses both fluoropolyethers (e.g. galden) and fluoromonoethers as well as both hydrofluoroethers and perfluoroethers, the term "oxirane" encompasses both hydrofluorooxiranes and perfluorooxiranes, the term "fluoroamine" encompasses both hydrofluoroamines and perfluoroamines, the term "fluoroketone" encompasses both hydrofluoroketones and perfluoroketones, the term "fluoroolefin" encompasses both hydrofluoroolefins and perfluoroolefins, and the term "fluoronitrile" encompasses both hydroflucronitriles and perfluoronitriles. It can thereby be preferred that the fluoroether, the oxirane, the fluoroamine, the fluoroketone and the fluoronitrile are fully fluorinated, i.e. perfluorinated.

In embodiments, the dielectric insulation medium can further comprise a background gas or carrier gas different from the organofluorine compound (in particular different from the fluoroether, the oxirane, the fluoroamine, the fluoroketone, the fluoroolefin and the fluoronitrile) and can in embodiments be selected from the group consisting of: air, $N_2$, $O_2$, $CO_2$, a noble gas, $H_2$; $NO_2$, NO, $N_2O$; fluorocarbons and in particular perfluorocarbons, such as $CF_4$; $CF_3I$, $SF_6$; and mixtures thereof.

According to further embodiments, the electrical apparatus is selected from the group consisting of: a switchgear, in particular a gas-insulated switchgear (GIS), or a part and/or component thereof, a busbar, a bushing, a cable, a gas-insulated cable, a cable joint, a gas-insulated line (GIL), a transformer, a current transformer, a voltage transformer, a surge arrester, an earthing switch, a disconnector, a combined disconnector and earthing switch, a load-break switch, a circuit breaker, any type of gas-insulated switch, a high voltage apparatus, a medium voltage apparatus, a low voltage apparatus, a direct-current apparatus, an air-insulated insulator, a gas-insulated metal-encapsulated insulator, sensors, a capacitor, an inductance, a resistor, a current limiter, a high voltage switch, a gas circuit breaker, a vacuum circuit breaker, a generator circuit breaker, a medium voltage switch, a ring main unit, a recloser, a sectionalizer, a low voltage switch, a distribution transformer, a power transformer, a tap changer, a transformer bushing, a power semiconductor device, a power converter, a converter station, a convertor building, a computing machine, and components and/or combinations of such devices.

In addition to the apparatus described above, the present invention further relates to a method for recovering a substance from an insulation medium of an electrical apparatus for the generation, transmission, distribution and/or usage of electrical energy, the insulation medium comprising an organofluorine compound and at least one further component. The method comprises the steps of:

a) conveying an initial gas mixture containing the organofluorine compound and at least one further component of the insulation medium out of the insulation space into a substance recovery device, b) liquefying and/or solidifying the organofluorine compound in the substance recovery device, and
c) separating the liquefied and/or solidified organofluorine compound from the at least one remaining component of the initial gas mixture.

As mentioned above in connection with the apparatus of the present invention, the organofluorine compound can be recycled into the insulation space, which is highly advantageous from both an economic as well as an ecologic point of view.

The method of the present invention further allows evacuation of the insulation space by means of a pump, in particular a suction pump, without facing the problem of liquefaction in the pressurization zone of the pump. This is achieved by simply arranging the pump downstream of the substance recovery device, as discussed above. Thus, replacement of the insulation medium can be carried out in a very safe manner.

All features which are described as preferable for the apparatus are also to be considered preferable for the method of the present invention, and vice versa.

According to an embodiment, steps a) to c) are subsequent steps. It is further preferred that in step b), only the organofluorine compound is liquefied and/or solidified.

As also mentioned in connection with the apparatus of the present invention, the initial gas mixture is preferably cooled below the dew point of the organofluorine compound for liquefying and/or solidifying the organofluorine compound according to step b).

In further embodiments, the initial gas mixture is preferably purified from liquid and/or solid impurities by a filter before being conveyed to the substance recovery device according to step a). As mentioned above, the risk of clogging of the substance recovery device, and ultimately of a failure of the device, can be efficiently reduced by this purification step.

In further embodiments, the method preferably comprises the further step of:
d) collecting the condensed organofluorine compound by an organofluorine compound collecting device.

In further embodiments, after step c) or optionally after step d), the method comprises the further step of:
e) conveying the organfluorine compound to an organofluorine compound reservoir tank for being stored therein.

The method allows, after step c) or optionally after step d) or e), the further step of:
f) reintroducing the organofluorine compound into the insulation space,
which contributes to the economic and ecologic benefits of the present invention.

The initial gas mixture is preferably conveyed by means of a suction pump. Alternatively or additionally, it can further be conveyed by purging the insulation space, thereby forcing the initial gas mixture out of the insulation space. The pump used for purging the insulation space can be identical to the suction pump mentioned above, in which case both the pump inlet as well as the pump outlet are connected to the insulation space, such that a flow of gas from the insulation space to the pump is generated on the suction side and a flow of gas from the pump to the insulation space is generated on the discharge side of the pump.

In embodiments also disclosed in connection with the apparatus of the present invention described above, the at least one remaining component of the initial gas mixture is preferably conveyed to a secondary reservoir tank for being stored therein.

In yet further embodiments the at least one remaining component of the initial gas mixture is reintroduced into the insulation space, and, according to a particularly preferred embodiment, is purified before being reintroduced into the insulation space.

The present invention is further illustrated by way of the attached

FIG. 1 showing schematically an electrical apparatus comprising a substance recovery device according to the present invention.

FIG. 1 shows the electrical apparatus 10 of the present invention comprising a housing 12 enclosing an electrical apparatus interior space. The electrical apparatus interior space forms or comprises an insulation space 16, in which an electrical component 14 is arranged. The electrical component 14 can for example be connected to respective conductors 18a, 18b which are insulated from the material of the housing 12 by means of respective bushings. The electrical component 14 is surrounded by an insulation medium 22 which comprises an organofluorine compound and a background gas and hence separates and electrically insulates the housing 12 from the electrical component 14.

The apparatus 10 further comprises a gas flow generating device 24 designed to generate a flow of an initial gas mixture through an outlet opening 26 arranged in the housing 12 out of the insulation space 16. In the embodiment shown, the gas flow generating device 24 is in the form of a suction pump 241.

The initial gas mixture contains the organofluorine compound and at least one further component. This further component can in particular be the background gas or a background gas component, but can also be a decomposition product generated from the organofluorine compound.

The outlet opening 26 opens out into a primary gas channel 28 which fluidly connects the insulation space 16 with a substance recovery device 30. Between the outlet opening 26 and the substance recovery device 30, a filter 32 can be arranged, which is designed such to remove solid or liquid impurities from the flow of the initial mixture prior to entering the substance recovery device 30.

The substance recovery device 30 comprises a separator 34 for separating—or, in general throughout this disclosure, comprises a separator 34 having means for separating or being designed to separate—the organofluorine compound from the at least one remaining component of the initial gas mixture. For this purpose, the separator 34 comprises in the embodiment shown a liquefaction device 36 adapted for liquefying the organofluorine compound. In the embodiment shown, the liquefaction device 36 is in the form of a cooler 361 for cooling the initial gas mixture below the dew point of the organofluorine compound. Additionally or alternatively, the liquefaction device can also be or comprise a compressor for liquefying the organofluorine compound by a pressure increase.

For collecting the organofluorine compound separated by the separator 34, the apparatus can further comprise an organofluorine compound collecting device 38. The organofluorine compound collecting device 38 can e.g. be in the form of a funnel 381, as schematically indicated in FIG. 1, and leads in the embodiment shown to an organofluorine compound reservoir tank 40 for storing the organofluorine compound.

In embodiments, the organoflourine compound collecting device 38 is arranged below the separator 34 to allow the liquefied organofluorine compound to flow downward or the solidified organofluorine compound to fall downward into the organoflourine compound collecting device 38.

From the organofluorine compound reservoir tank 40 of the substance recovery device 30, an organofluorine compound recycling channel 42 leads to an organofluorine compound inlet opening 44 arranged in the housing 12 and designed such to reintroduce the organofluorine compound into the insulation space 16.

From the separator 34 of the substance recovery device 30, a secondary gas channel 46 branches off. By means of the suction pump 241, which is arranged downstream of the substance recovery device 30, the at least one remaining component of the initial gas mixture without the organofluorine compound is guided through the secondary gas channel 46 and is led to a secondary reservoir tank 48 for storing the at least one remaining component of the initial gas mixture. In this regard, the suction pump 241 also functions as a compressor for compressing the remaining components.

The secondary reservoir tank 48 is fluidly connected to a gas inlet opening 50 arranged in the housing 12 for reintroducing the at least one remaining component of the initial gas mixture into the insulation space 16. In the embodiment shown, the gas inlet opening 50 is in the form of a secondary gas inlet 501 opening separate from the organofluorine compound inlet opening 44.

LIST OF REFERENCE NUMERALS

10 electrical apparatus
12 housing
14 electrical component
16 insulation space
18a, 18b conductors
22 insulation medium
24; 241 gas flow generating device
241 pump, suction pump
26 outlet opening
28 primary gas channel
30 substance recovery device
32 filter
34 separator
36; 361 liquefaction device
361 cooler
38; 381 organofluorine compound collecting device
381 funnel
40 organofluorine compound reservoir tank
42 organofluorine compound recycling channel
44 organofluorine compound inlet opening
46 secondary gas channel
48 secondary reservoir tank
50; 501 gas inlet opening for reintroducing the at least one remaining component; secondary gas inlet opening.

The invention claimed is:

1. Electrical apparatus for generation, transmission, distribution and/or usage of electrical energy, the electrical apparatus comprising housing enclosing an electrical apparatus interior space, at least a portion of said electrical apparatus interior space comprising at least one insulation space, in which an electrical component is arranged and which contains an insulation medium surrounding the electrical component, the insulation medium comprising an organofluorine compound and at least one further component in gaseous phase,
the electrical apparatus further comprising a gas flow generating device designed to generate a flow of an initial gas mixture through an outlet opening arranged in the housing out of the insulation space, the initial gas mixture containing the organofluorine compound and the at least one further component of the insulation medium,
wherein downstream of the outlet opening a substance recovery device is arranged, the substance recovery device comprising a separator for separating the organofluorine compound from the at least one further component of the initial gas mixture, said separator being or comprising a solidification device adapted for solidifying the organofluorine compound.

2. Electrical apparatus according to claim 1, wherein the initial gas mixture is at least essentially identical to the insulation medium.

3. Electrical apparatus according to claim 1, wherein the solidification device is specifically adapted for solidifying the organofluorine compound only.

4. Electrical apparatus according to claim 1, wherein the solidification device is or comprises a cooler for cooling the initial gas mixture down to a temperature below the dew point of the organofluorine compound.

5. Electrical apparatus according to claim 1, wherein the outlet opening opens into a primary gas channel, which fluidically connects the insulation space with the substance recovery device.

6. Electrical apparatus according to claim 1, wherein the substance recovery device further comprises an organofluorine compound collecting device for collecting the organofluorine compound separated by the separator, wherein the organofluorine compound collecting device is arranged below the separator to allow the solidified organofluorine compound to fall downward into the organofluorine compound collecting device.

7. Electrical apparatus according to claim 1, wherein the substance recovery device further comprises at least one organofluorine compound reservoir tank for storing the organofluorine compound separated by the separator.

8. Electrical apparatus according to claim 1, the apparatus further comprising a filter arranged between the outlet opening and the substance recovery device and designed such to remove solid or liquid impurities from the flow of the initial gas mixture.

9. Electrical apparatus according to claim 1, the apparatus further comprising an organofluorine compound recycling channel leading from the substance recovery device to an organofluorine compound inlet opening arranged in the housing and designed such to reintroduce the organofluorine compound into the insulation space.

10. Electrical apparatus according to claim 9, wherein upstream of the organofluorine compound inlet opening an organofluorine compound treatment device is arranged for removing impurities from the organofluorine compound to be reintroduced into the insulation space.

11. Electrical apparatus according to claim 1, wherein the gas stream generating device is or comprises a pump.

12. Electrical apparatus according to claim 1, wherein the pump is a suction pump and is arranged downstream of the substance recovery device.

13. Electrical apparatus according to claim 1, wherein the pump is designed such to purge the insulation space, thereby forcing the initial gas mixture out of the insulation space.

14. Electrical apparatus according to claim 1, wherein from the separator of the substance recovery device at least one of secondary gas channel branches off, the at least one of secondary gas channel being adapted for guiding the at least one further component of the initial gas mixture without the organofluorine compound.

15. Electrical apparatus according to claim 14, wherein the at least one secondary gas channel leads to a secondary reservoir tank for storing the at least one further component of the initial gas mixture.

16. Electrical apparatus according to claim 14, wherein the at least one secondary gas channel, is fluidly connected to a gas inlet opening arranged in the housing for reintroducing the at least one further component of the initial gas mixture into the insulation space.

17. Electrical apparatus according to claim 16, wherein upstream of the gas inlet opening a secondary treatment device is arranged for purifying the at least one further component of the initial gas mixture.

18. Electrical apparatus according to claim 1, wherein the organofluorine compound is selected from the group consisting of fluoroethers, fluoroketones, fluoroolefins, and fluoronitriles.

19. Electrical apparatus according to claim 1, wherein the insulation medium comprises a hydrofluoromonoether containing at least three carbon atoms.

20. Electrical apparatus according to claim 1, wherein the insulation medium comprises a fluoroketone containing from four to twelve carbon atoms.

21. Electrical apparatus according to claim 1, wherein the at least one further component is selected from the group consisting of air, an air component, nitrogen, oxygen, carbon dioxide, a nitrogen oxide, and mixtures thereof.

22. Electrical apparatus according to claim 1, wherein the electrical component is one of a high voltage or medium voltage apparatus, and a high voltage or medium voltage component.

23. Electrical apparatus according to claim 1, wherein the apparatus is selected from the group consisting of: switchgear, a gas-insulated switchgear (GIS), or a part and/or component thereof, busbar, bushing, cable, gas-insulated cable, cable joint, gas-insulated line (GIL), transformer, current transformer, voltage transformer, surge arrester, earthing switch, disconnector, combined disconnector and earthing switch, load-break switch, circuit breaker, any type of gas-insulated switch, high voltage apparatus, medium voltage apparatus, low voltage apparatus, direct-current apparatus, air-insulated insulator, gas-insulated metal-encapsulated insulator, sensors, capacitor, inductance, resistor, current limiter, high voltage switch, gas circuit breaker, vacuum circuit breaker, generator circuit breaker, medium voltage switch, ring main unit, recloser, sectionalizer, low voltage switch, distribution transformer, power transformer, tap changer, transformer bushing, power semiconductor device, power converter, converter station, convertor building, computing machine, and components and/or combinations of such device.

24. Electrical apparatus according to claim 1, wherein the separator is a solidification device that provides a phase transition of the organofluorine compound from gaseous phase to solid phase, and does not provide a phase transition of the at least one further component of the initial gas mixture.

25. Method for recovering a substance from an insulation medium of an electrical apparatus for the generation, transmission, distribution and/or usage of electrical energy, the insulation medium comprising an organofluorine compound and at least one further component in gaseous phase, said method comprising the method elements of:
   a) conveying an initial gas mixture containing the organofluorine compound and the at least one further component of the insulation medium out of the insulation space into a substance recovery device,
   b) solidifying the organofluorine compound in the substance recovery device, and
   c) separating the solidified organofluorine compound from the at least one further component of the initial gas mixture.

26. Method according to claim 25, wherein the method elements a) to c) are repeated.

27. Method according to claim 25, wherein in method element b), only the organofluorine compound is solidified.

28. Method according to claim 25, wherein for solidifying the organofluorine compound according to method element b), the initial gas mixture is cooled below the dew point of the organofluorine compound.

29. Method according to claim 25, wherein the initial gas mixture is purified from liquid and/or solid impurities by a filter before being conveyed to the substance recovery device according to the method element a).

30. Method according to claim 25, wherein after method element c), the method comprises the further method element of:
   d) collecting the condensed organofluorine compound by an organofluorine compound collecting device.

31. Method according to claim 25, wherein after step c), the method comprises the further method element of:
   e) conveying the organofluorine compound to an organofluorine compound reservoir tank for being stored.

32. Method according to claim 25, wherein after method element c), the method comprises the further method element of:
   f) reintroducing the organofluorine compound into the insulation space.

33. Method according to claim 32, wherein before being reintroduced into the insulation space, the organofluorine compound is treated by removing impurities from the organofluorine compound.

34. Method according to claim 25, wherein the initial gas mixture is conveyed by means of a suction pump.

35. Method according to claim 25, wherein the initial gas mixture is conveyed by purging the insulation space, thereby forcing the initial gas mixture out of the insulation space.

36. Method according to claim 25, wherein the at least one further component of the initial gas mixture is conveyed to a secondary reservoir tank for being stored.

37. Method according to claim 25, wherein the at least one further component of the initial gas mixture is reintroduced into the insulation space.

38. Method according to claim 37, wherein before being reintroduced into the insulation space, the at least one further component of the initial gas mixture is purified.

39. Electrical apparatus according to claim 1, wherein the initial gas mixture comprises apart from the organofluorine compound a background gas and at least one decomposition product; or wherein the initial gas mixture relates to the insulation medium for filling the insulation space and contains apart from the organofluorine compound a background gas and is devoid of any decomposition products.

40. Method according to claim 25, wherein the initial gas mixture comprises apart from the organofluorine compound a background gas and at least one decomposition product; or wherein the initial gas mixture relates to the insulation medium for filling the insulation space and contains apart from the organofluorine compound a background gas and is devoid of any decomposition products.

41. Electrical apparatus for generation, transmission, distribution and/or usage of electrical energy, the electrical apparatus comprising housing enclosing an electrical apparatus interior space, at least a portion of said electrical apparatus interior space comprising at least one insulation space, in which an electrical component is arranged and which contains an insulation medium surrounding the electrical component, the insulation medium comprising an organofluorine compound and at least one further component in gaseous phase, the electrical apparatus further comprising a gas flow generating device designed to generate a flow of an initial gas mixture through an outlet opening arranged in the housing out of the insulation space, the initial gas mixture containing the organofluorine compound and the at least one further component of the insulation medium, wherein downstream of the outlet opening a substance recovery device is arranged, the substance recovery device comprising a separator for separating the organofluorine compound from the at least one further component of the initial gas mixture, said separator being or comprising a liquefaction device adapted for liquefying and/or a solidification device adapted for solidifying the organofluorine compound, the apparatus further comprising an organofluorine compound recycling channel leading from the substance recovery device to an organofluorine compound inlet opening arranged in the housing and designed such to reintroduce the organofluorine compound into the insulation space, wherein upstream of the organofluorine compound inlet opening an organofluorine compound treatment device is arranged for removing impurities from the organofluorine compound to be reintroduced into the insulation space.

* * * * *